Sept. 15, 1959 P. EISLER 2,904,761

MAGNETIC CIRCUIT COMPONENTS

Original Filed Feb. 27, 1948 4 Sheets-Sheet 1

Inventor
PAUL EISLER
By Emery, Holcombe & Blair
Attorney

Sept. 15, 1959 P. EISLER 2,904,761

MAGNETIC CIRCUIT COMPONENTS

Original Filed Feb. 27, 1948 4 Sheets-Sheet 2

*Inventor*
PAUL EISLER
By Emery, Holcombe & Blair
*Attorney*

Sept. 15, 1959 P. EISLER 2,904,761

MAGNETIC CIRCUIT COMPONENTS

Original Filed Feb. 27, 1948 4 Sheets-Sheet 3

*Inventor*
PAUL EISLER
*By* Emery, Holcombe & Blair
*Attorney*

*INVENTOR*
PAUL EISLER
BY [signature]
*ATTORNEY*

United States Patent Office 2,904,761

Patented Sept. 15, 1959

2,904,761

MAGNETIC CIRCUIT COMPONENTS

Paul Eisler, London, England, assignor to Hermoplast Limited, London, England, a corporation of Great Britain

Application February 27, 1948, Serial No. 11,798, which is a division of application Serial No. 520,991, February 3, 1944. Divided and this application December 17, 1951, Serial No. 261,990

4 Claims. (Cl. 336—83)

This invention relates to the manufacture of electrical apparatus, and particularly to the production of magnetic circuits and parts thereof.

A principal purpose of the invention is to facilitate and cheapen quantity production of circuit components, such as transformers, the cores of iron-cored transformers and dynamo electric machines, and generally of any circuit component which it may be convenient to manufacture by the methods herein disclosed.

A further purpose of the invention is to facilitate the production of circuit components, even though they be not needed in great quantities, in which a high degree of precision is required in the dimensioning or relative location of conductors such as cannot readily be obtained by known means.

Other objects of the invention will appear from the description following.

Most circuit components essentially comprise metal parts conducting magnetic flux, supported upon an insulating base, or with interposed insulation upon a metal base.

The invention consists in the production of the metal magnetic conductors in position upon their insulating support by a process based on the printing of a representation of the conductive metal.

The common way of building up an electrical circuit or circuit element is first to draw metal into wire, that is to say, make a linear conductor, and afterwards to shape this conductor into coils and networks. By the application of the methods of the printing art the invention brings the metal conductor of the circuit component into existence in its final form, or in a development of that form upon a plane or cylindrical surface.

A typical instance of the invention comprises the steps of preparing by any of the well-known methods of the printing art, a printing plate for printing a representation of the metal magnetic conductors of the circuit component or a part of them; making an imprint by the aid of the printing plate upon a surface thereby differentiating on that surface the areas which are required to be conductive from the areas which are required to be non-conductive; and from that imprint producing the conductor by subjecting the printed surface to treatment which operates differently on the areas of the surface differentiated by the printing, thereby changing the differentiation into a differentiation of conductive and non-conductive areas.

The development of the conductor from the imprint is in most cases effected by methods adapted from the printing art or analogous to the methods of the printing art, such as etching, bronzing, electro-deposition and the like.

Where on account of the process of development adopted, or on account of the nature of the fabric which is to form the permanent base of the conductor, it is inconvenient to make the imprint on the permanent base, it may be made on a temporary base, which must be removable, and the development process be followed by a transfer process akin to those known in the printing art.

The invention is explained hereinafter by a description of the production of various circuit components by its aid. This description refers to the accompanying drawings in which—

Figures 1, 2:
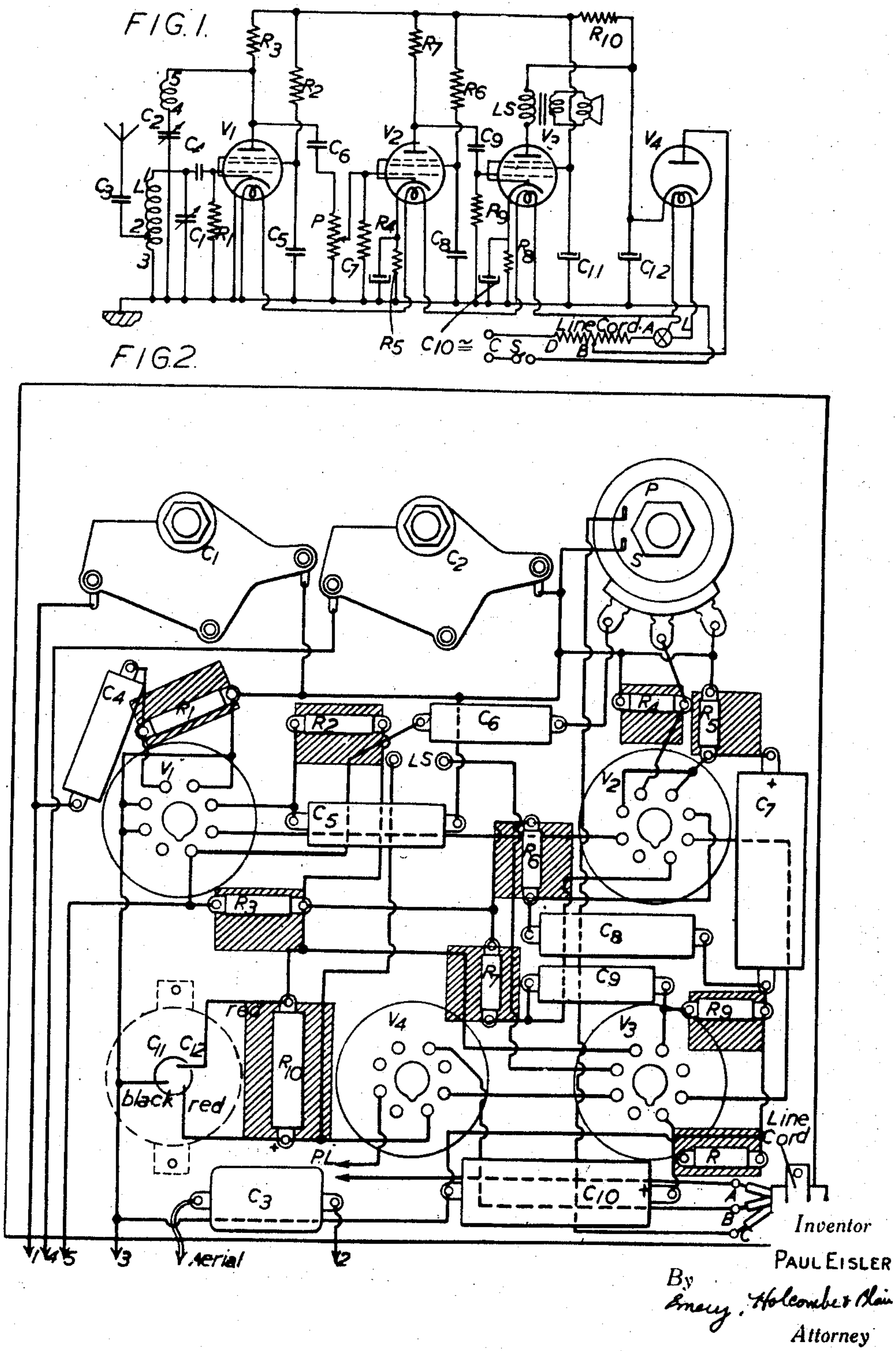
Figure 1 is a diagram of connections of a radio receiver.
Figure 2 is a diagram showing the approximate layout of the components of this receiver.

The diagram of connections or hook-up shown in Figure 1 forms no part of the invention; being substantially known, and will be described no further than is necessary to assist the understanding of Figures 2, 3 and 4, which also form no part of the present invention but are included for the purpose of describing a method of manufacture preferred for the forming of the magneto-conductive circuit components which constitute the invention. Figure 1 shows valves $V_1$, $V_2$, etc., resistances $P_1$, $R_1$, $R_2$, etc., inductances such as $L'$, capacitances $C_1$, $C_2$, etc., an output transformer LS, and a network of conductors by which these other components are connected together. It is the production of this network alone that is of interest in connection with the present invention.

The radio engineer charged with the manufacture of a radio receiver according to Figure 1, must first plan the layout of the several components, including the connecting network, and produce a layout and wiring plan such as is shown in Figure 2. The design of this layout is again a matter for the radio engineer with which the present invention is not primarily concerned; though the radio engineer familiar with the present invention will naturally in planning his layout have regard to the fact that such and such components of it are to be made by the methods of the present invention. The correspondence between Figures 1 and 2 is sufficiently apparent from the references upon the several parts already mentioned.

It will be noted that the circuit connections shown in Figure 2 involve several instances of crossing conductors; for instance the connection from LS to $V_3$ crosses the connection from $R_3$ to $V_3$. In wiring with pre-formed wires such connections are kept separate by suitable disposition in three dimensions; Figure 2 is not intended to represent such disposition; indeed some conductors are displaced to one side merely for the sake of clearness.

For the application of the invention to the manufacture of such a network it is manifestly convenient for the connections to be disposed in one plane; but if they cannot be so disposed without crossings it will be convenient to dispose them in two or three or more planes;

so making the network two or more circuit components which are printed separately or side by side and afterwards assembled in superposition or other desired relation and connected together where necessary.

Figure 3:
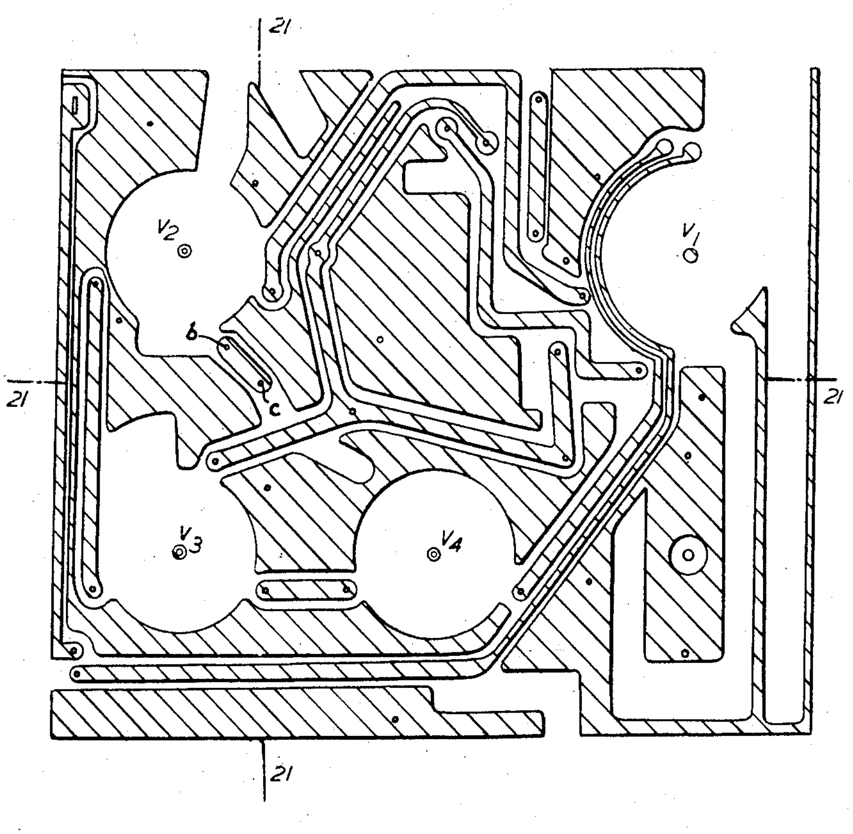
Figures 3 and 4 show two part schemes of connections prepared for the purpose of applying the invention to the manufacture of the circuit connections of this receiver.
Figures 4, 5:
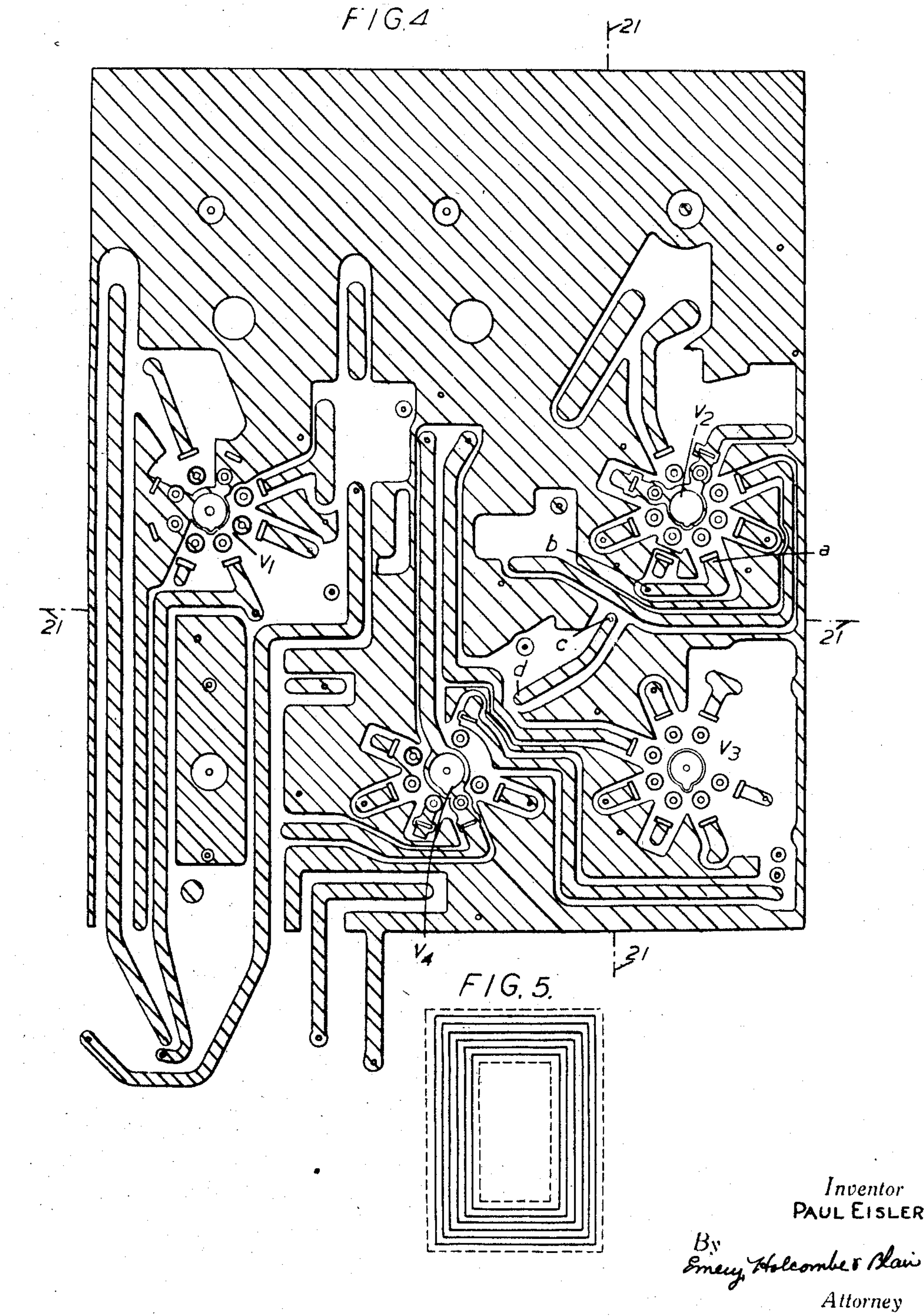
Figure 5 illustrates the making of a transformer core according to the invention.

In the present instance the whole of the circuit connections can conveniently be set out in two planes, and they are shown so set out in Figures 3 and 4. The general resemblance of Figures 3 and 4 to the layout plan of Figure 2 can be seen at a glance, and the location of various components other than the network itself can readily be recognized. For example, $V_1$, $V_2$, $V_3$, and $V_4$ in Figures 3 and 4 mark the location in the network of the tubes or valves indicated by those references in Figures 1 and 2. It will be seen that if Figure 4 be directly superposed on Figure 2 the valves, or rather valve holders, indicated in the latter figure come in the places to which valve connections converge in Figure 4. Figure 3 will similarly register with Figure 2 and with Figure 4 if turned face downward. If the correspondence of these figures be studied in detail it will be seen that some conductors shown in Figure 2 appear in part in Figure 3 and in part in Figure 4; for example, the connection between $V_2$, $C_9$ and $R_7$ in Figure 2 is represented by the connection *a, b* from the position of $V_2$ in Figure 4, the connection *b, c* in Figure 3, and the connection *c, d* in Figure 4. Provision has to be made for joining these connections into one conductor in the finished articles; for this reason the parts of it are drawn so that their ends overlap when Figures 3 and 4 are superposed back to back; thus the points *b* and *c* of Figure 4 overlap and register with the points *b* and *c* of Figure 3.

To make possible the employment of universal tools, as hereinafter described, in the manufacture of various schemes of connections, of which Figures 1 and 2 are only one example, it is convenient to limit the possible positions of junction points such as *b* and *c*. For this reason it is of advantage to prepare the drawings of the part schemes, Figures 3 and 4, by the aid of squared tracing paper and to arrange that every junction point falls upon an intersection of the lines of the grid. It would only confuse Figures 3 and 4 to superpose such a grid upon them; two lines of the grid are indicated by the chain lines 21 passing through the point *c*, in both Figures 3 and 4.

From the drawings, Figures 3 and 4, printing plates are prepared by any of the usual methods of the printing art. These printing plates may, for example, be engravings on metal, or lithographic stones, or they may be prepared by any usual photomechanical process, or they may be photographic plates. The printing plates so produced may be in relief, in intaglio, or planographic, according to the method of production.

From the two printing plates so produced any desired number of identical prints of the circuit component may be made.

In one form of the invention, convenient for the instance under consideration, the prints are made upon a composite material consisting of metal foil upon an insulating backing. The thickness and nature of the foil and of the backing depend upon the particular process chosen for converting the imprint of the circuit component into a circuit component. Metallized or metal-severed paper is one material; it is preferable to impregnate the paper with an acid-resisting varnish made of a suitable plastic. Or metal foil may be coated with varnish or with a layer of plastic of the desired thickness. Or a metal coating may be applied to a preformed sheet of insulating material, such as a plastic. Zinc, aluminum, and copper may be named among suitable metals.

For the purpose of the particular example of the invention now under consideration, the print is made with an acid-resistant ink upon the metal side of such composite material. Except where the pattern to be printed is very fine it is an advantage to impart a grain to the metal surface by use of an etching bath, or by abrasion or otherwise, prior to printing. The print may be made directly from the printing plate or by the off-set method. To ensure a print free from pinholes, the print may be overprinted, or otherwise reinforced. The print is naturally identical with Figures 3 and 4, and those figures equally represent the drawing from which the printing plate was prepared, and the print made from the plate upon the metal surface of a composite sheet.

The part circuit components are next perforated at all the points at which junction has to be made between the conductors of the sheet corresponding with Figure 3 and those on the sheet corresponding with Figure 4, that is to say at all points such as *c*. The restricted location of such junction points as above described enables all the perforations, whether for these particular components or for any other circuit components of like area, to be made by a universal punching tool in which pin punches can be inserted at any of a large number of positions corresponding with the intersections of the grid employed in preparing Figures 3 and 4. If these are large areas of metal to be removed they may be punched out prior to etching, for instance simultaneously with the perforation, so as to even up the extent of etching necessary all over the print.

The sheet is then etched in the well-known manner of the printing art, in a bath suited to the particular metal employed, but with this difference from the usual etching of a printing process that the metal not protected by the resistant ink is wholly etched away. To permit of these complete etching away without undue undercutting of the protected parts it may be convenient, as is commonly done in preparing printing plates, to interrupt the etching and re-coat the surface, for instance with a fatty ground, which can be made to protect the sides of the etched lines as well as the outer surface. When etching is complete the ink may be washed off.

It will be clear that Figures 3 and 4 equally represent the etched print, that is to say they may be regarded as depicting a sheet of insulating material coated with metal over the shaded parts only.

If desired the metal may be protected and insulated by a coating of varnish except over points required to be accessible for purposes of testing or the making of further connections.

The circuit may be tested by a universal testing appliance which permits of contacts being set in desired positions on a surface.

If desired a single printing plate may reproduce the two representations, Figures 3 and 4, side by side, on the same composite sheet. In that case the conductors developed from the print are superposed by folding the sheet back upon itself with the conductors outward.

It will be seen that the essence of the particular method of producing circuit components just described is the preparation of a printing plate, the printing from it of a representation of the conductors of the circuit component, thereby differentiating on the printed surface the areas which are required to be conductive from those which are required to be non-conductive, and the subjecting of the surface to an after treatment which operates differently on the differentiated parts and converts the differentiation into a differentiation of conductive and non-conductive areas. The imprint made is a positive imprint, that is to say the inked part represents the conductors of the component; and the imprint is made on metal; and the component is completed by removal of metal from the unprinted areas. It will be seen below that it is not essential that the imprint be positive, nor that the component be developed by removal of metal.

In the particular method just described removal of metal was effected by chemical etching; it could equally well be removed by electrolysis, the print being made on metal foil upon a conductive backing, say of another metal, and the printed surface being made the anode in a bath of electrolyte which attacks the foil. This method is appropriate when it is to be followed by transfer of the conductor to a permanent insulating base, after which the conductive backing is dissolved or otherwise removed. In the case of some metal foils, for example aluminum, it may be convenient, instead of removing them wholly, to convert them into non-conductors, a process well-known as "anodizing," and which also consists essentially in making the metal an anode in a suitable electrolytic bath.

Instead of producing the circuit component from the imprint by removal of metal it may be produced by adding metal. For example, the printing plate may be prepared to print a negative of the circuit component, that is to say, to cover with ink those parts of the surface which are to be non-conductive. A negative imprint can be made in insulating ink upon metal foil, say zinc foil, on a suitable backing, and additional metal of a different kind, say copper, can be added to the parts not inked by electrodeposition, the printed foil being made the cathode in an electrolytic bath. These methods, also appropriately precede transfer, for the metal foil must subsequently be removed, at least over those areas covered by the ink and therefore not covered by added metal, and this may readily be done after transfer in an acid bath which attacks the metal of the foil but not the added metal.

The printing plate may be a photographic plate of film, in which case the imprint is made by contact printing or projection upon a sensitized surface. For example, a metal plate may be gelatine coated as in zincography, and printed from a negative of the circuit component. The coating is hardened where it is exposed to light and elsewhere may be washed away, and the metal so uncovered can be etched away, preferably in stages. Or the hardened gelatine may be inked and dusted. The imprint may be transferred to a permanent base prior to consolidation, and this is necessary if the gelatine could not withstand the consolidation process chosen.

Any of the processes above described may include or be followed by the step of transferring the imprint from a temporary to a permanent base, provided due regard be paid to the requirements of that step in the selection of materials.

These various methods by which an imprint of a circuit component is converted into a circuit component are to be regarded as illustrative examples only; to those acquainted with the printing art, from which most of the individual steps employed are taken, with some modification, it will be obvious that many other modified operations or modified sequences of operations may be adopted according to the nature of the circuit component that is to be made. A few of these are mentioned below in connection with the making of particular circuit components.

The invention is applied to the making of the magnetoconductive part of an electrical circuit component, such as a transformer core and the metal employed for metallization is naturally iron. The invention is especially of value in the making of cores for radio frequency transformers for in these it is worth while for the avoidance of eddy current losses to divide the iron of the core, not merely into laminations, but into separate and fine wires. The printing of a pattern of parallel iron conductors as shown in Figure 5 upon a ground of the thinnest insulation that will afford the requisite strength and has the desired electrical properties, and the stamping out of the pattern from the sheet and of the center from the pattern as indicated by the dotted lines, need no further explanation; nor does the building up of the core by assembling a great number of such patterns in a pile. Obviously any usual form of laminated core may be built of printed line patterns in this way.

Figure 6:
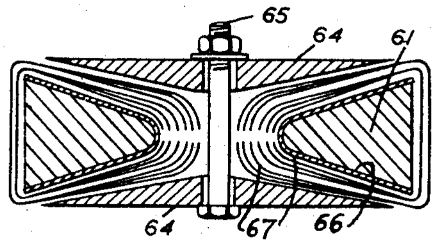
Figure 6 is a cross-section of a transformer built by the method of the invention.
Figure 7:
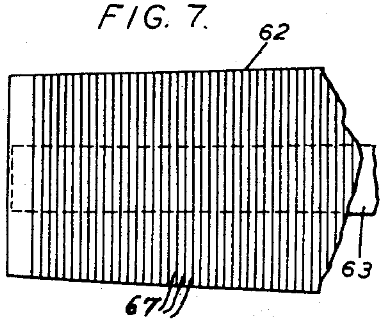
Figure 7 illustrates the printing of one of the core strips shown in Figure 6.
Figure 8:
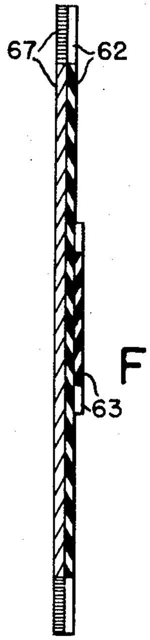
Figure 8 is a cross-section of a printed core strip, the thickness being much exaggerated.
Figure 9:
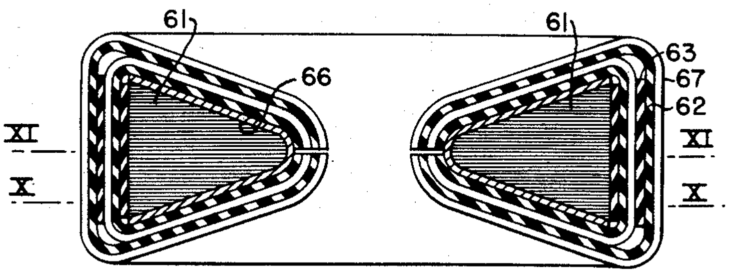
Figure 9 is a cross-section of a winding with two turns of the core folded about it, the thickness of the strip being exaggerated as in Figure 8.
Figure 10:
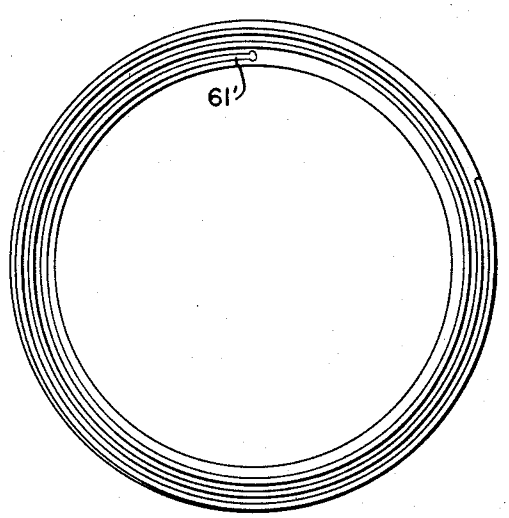
Figure 10 is a cross-section of a printed winding element on the line X—X of Figure 9.
Figure 11:
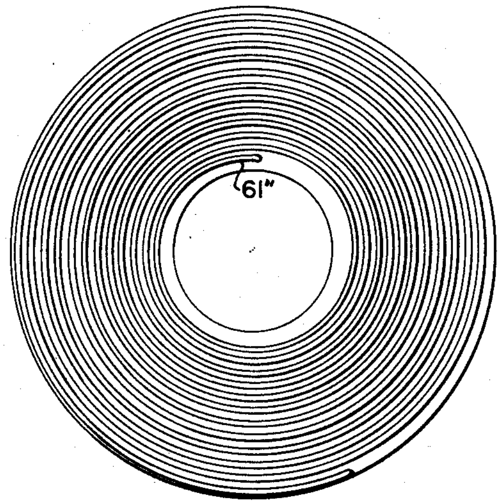
Figure 11 is a cross-section of a winding element on the line XI—XI of Figure 9, the iron lines and supporting strips being omitted in Figures 10 and 11 for clarity.

As already mentioned, where it is intended to use the method of the invention for the production of a circuit component regard may be had to that fact in the electrical design of the component. Figure 6 is a diagrammatic cross-section of a transformer designed to be built by the method of this invention. Its windings 61 may be built of superposed spirals, all of the same external diameter but decreasing in radial depth from the middle outwards with respect to its principal plane of symmetry. Figures 10 and 11 show two such spirals as examples, Figure 10 being a layer near the bottom of the winding showing a primary coil 61' and Figure 11 one from about the middle of the winding showing a secondary coil 61''. It should be understood that the width of the turns is much exaggerated in order that it may be visible, and in fact the layers would ordinarily have very many more turns. Also Figures 10 and 11 show for simplicity single spirals but if desired primary and secondary windings 61' and 61'' may be printed together, closely intermingled to eliminate magnetic leakage. Together the superposed imprints form an annulus of roughly triangular cross-section as seen in Figures 6 and 9. Alternatively the winding may be wound of wire upon a former of V section such as 66 (see Figure 9). The core is built from the printed strip 62 a fragment of which is shown in Figure 7 and an enlarged cross-section thereof is shown in Figure 8; it is a slightly tapering strip (the taper is exaggerated in the figures) on and across which are formed a number of parallel closely spaced iron lines 67. This strip 62 is of very thin insulating material and the printed lines are also thin. In the diagrammatic cross-section of Figure 8 the thicknesses are much exaggerated in order that they may be visible. The middle of the strip is reinforced by a narrow tapered strip 63 the thickness of which is also much exaggerated in Figure 8. The composite strip is wound around the winding 61 and as it is wound it is folded about the edges of the reinforcing strip 63 so that the ends of the iron lines come together in the middle of the core as seen in Figures 6 and 9. Both figures are of necessity diagrammatic. Figure 9 shows two turns of the core with the thickness of the strips and lines much exaggerated as in Figure 8. Preferably there are in all many more than two turns. Because the strip is thin it easily breaks and crumples where it is crushed at the center of the transformer permitting the ends of the iron lines 67 to overlap radially. The ends of the lines are brought into good magnetic contact and held by the end cheeks 64 and the bolt 65 as shown in Figure 6.

This application is a division of my application Serial No. 11,798, filed February 27, 1948, now Patent No. 2,587,568, itself a division of my application Serial No. 520,991, filed February 3, 1944, now Patent No. 2,441,960, dated May 25, 1948.

I claim:

1. A magnetically conductive member for an electromagnetic circuit component comprising a pliable sheet of insulation material, and a plurality of narrow foil strips of high magnetic permeability flatly adhering in parallel relationship to one of the surfaces of said sheet and having undercut edges, said foil strips forming magnetic conductors constituting the core material of said circuit component, said pliable insulation sheet being in the form of a strip slightly tapered toward its ends, said magnetic conductors extending transversely to the length of said strip.

2. A magnetically conductive member according to claim 1, wherein a re-enforcement strip made of pliable insulation material is secured to one side of said insulation strip extending along the mid-axis of said strip.

3. An electro-magnetic circuit component comprising electric coil means and a magnetically conductive member including a pliable insulation strip and a plurality of narrow foil strips of high magnetic permeability flatly adhering in parallel relationship to one of the surfaces of said strip and having undercut edges, said foil strips forming magnetic conductors constituting the magnetic core material of said component, said insulation strip with the foil strips thereon encompassing the electric coil means in a spatial relationship such that the said magnetic conductors cross the windings of said coil means substantially at right angles.

4. A circuit component according to claim 3, wherein said coil means are in form of superimposed ring-shaped layers forming an annulus, and wherein ends of said insulation strip meet on the peripheral inner surface of said annulus.

References Cited in the file of this patent

UNITED STATES PATENTS

| | | |
|---|---|---|
| 1,251,700 | Shaw | Jan. 1, 1918 |
| 2,011,697 | Vogt | Aug. 20, 1935 |
| 2,164,383 | Burton | July 4, 1939 |
| 2,277,474 | Bergtold | Mar. 24, 1942 |
| 2,279,014 | Sawyer | Apr. 7, 1942 |
| 2,297,488 | Luderitz | Sept. 29, 1942 |
| 2,301,882 | Kappeler | Nov. 10, 1942 |
| 2,431,393 | Franklin | Nov. 25, 1947 |

FOREIGN PATENTS

| | | |
|---|---|---|
| 260,731 | Great Britain | Nov. 11, 1926 |